Figure 1:
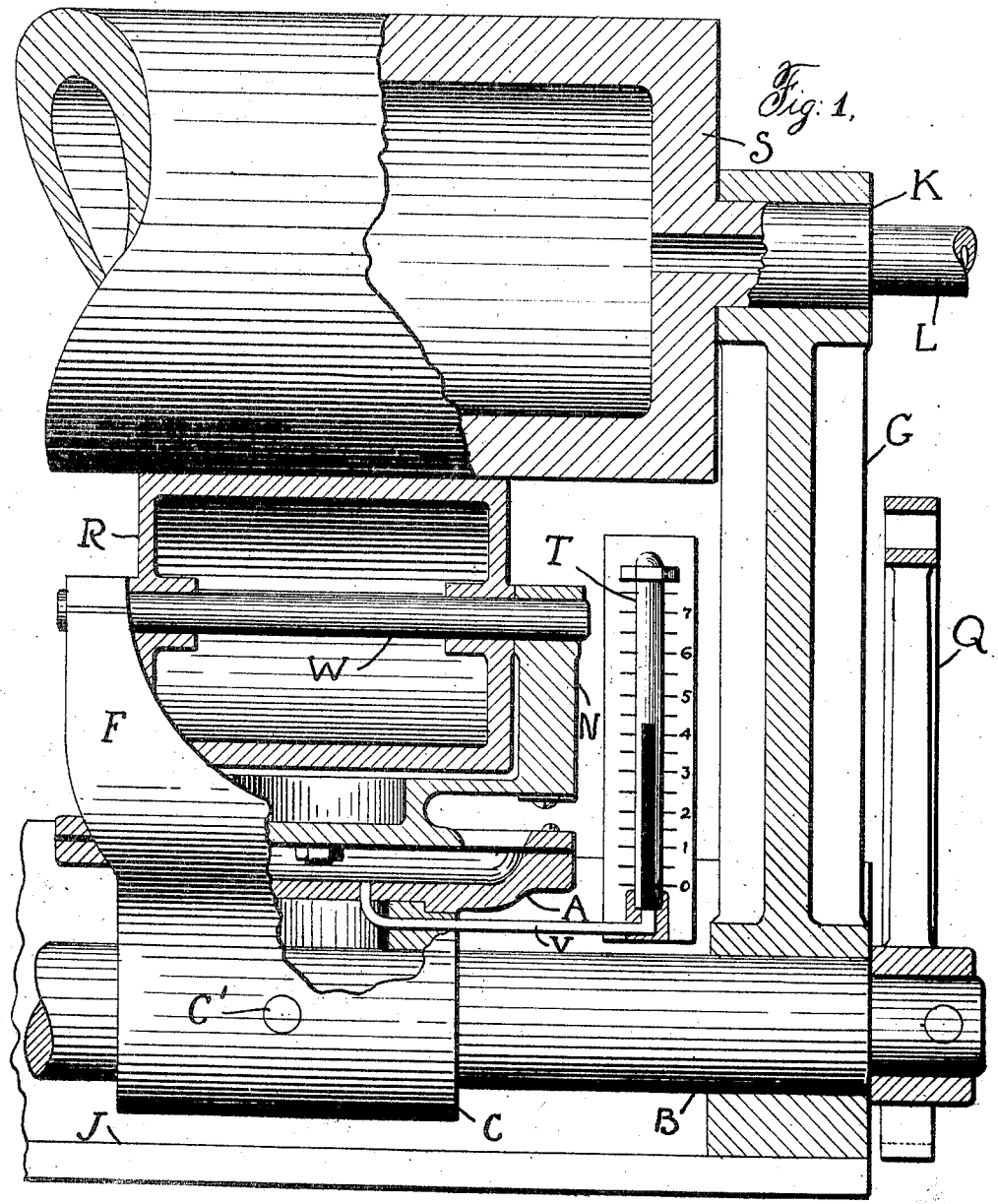

N. C. LOCKE.
INDICATOR.
APPLICATION FILED MAY 20, 1911.

1,038,770.

Patented Sept. 17, 1912.

3 SHEETS—SHEET 1.

Witnesses:
Arthur L. Dannell,
Thomas T. Seelye.

Nathaniel C. Locke, Inventor,
By his Attorney
W. D. Hutchinson

UNITED STATES PATENT OFFICE.

NATHANIEL C. LOCKE, OF SALEM, MASSACHUSETTS, ASSIGNOR OF TWO-THIRDS TO THOMAS FRENCH, OF RUMFORD, MAINE.

INDICATOR.

1,038,770.  Specification of Letters Patent.  Patented Sept. 17, 1912.

Application filed May 20, 1911. Serial No. 628,589.

*To all whom it may concern:*

Be it known that I, NATHANIEL C. LOCKE, of Salem, Essex county, Massachusetts, have invented a new and useful Improvement in Indicators, of which the following is a full, clear, and exact description.

My invention relates to the manufacture of paper and is intended to furnish a device by which it is possible to determine the thickness and weight of paper during the process of manufacture.

In the ordinary process of making paper a sheet is tested for thickness and weight after having been calendered, a small piece of the paper being cut out and weighed to see how it is running through the machine. Under the present means the weight can only be determined after the paper has been calendered. In the device embodied in my invention I supply two rollers, one of which is movable radially in respect to the other. This roller is supported on a diaphragm above a mercury chamber which is connected to a glass indicating tube, so that the exact distance between the two rollers will be indicated at once in the tube. When the two rollers are in contact the mercury will stand at zero in the tube. It is intended that this device shall be attached to the so-called spring roll of a paper machine, although it may be placed in any other suitable or desired position on the machine.

By placing the indicator comprised in my invention on each edge of the sheet of paper as it is passing through the machine, it is apparent that any variation in the thickness of the paper as it passes between the two rolls will be shown at once in an exaggerated way by the mercury rising or falling in the glass tube.

Reference is to be had to the accompanying drawings forming a part of this specification, in which similar reference characters indicate corresponding parts in all the views.

Figure 2:
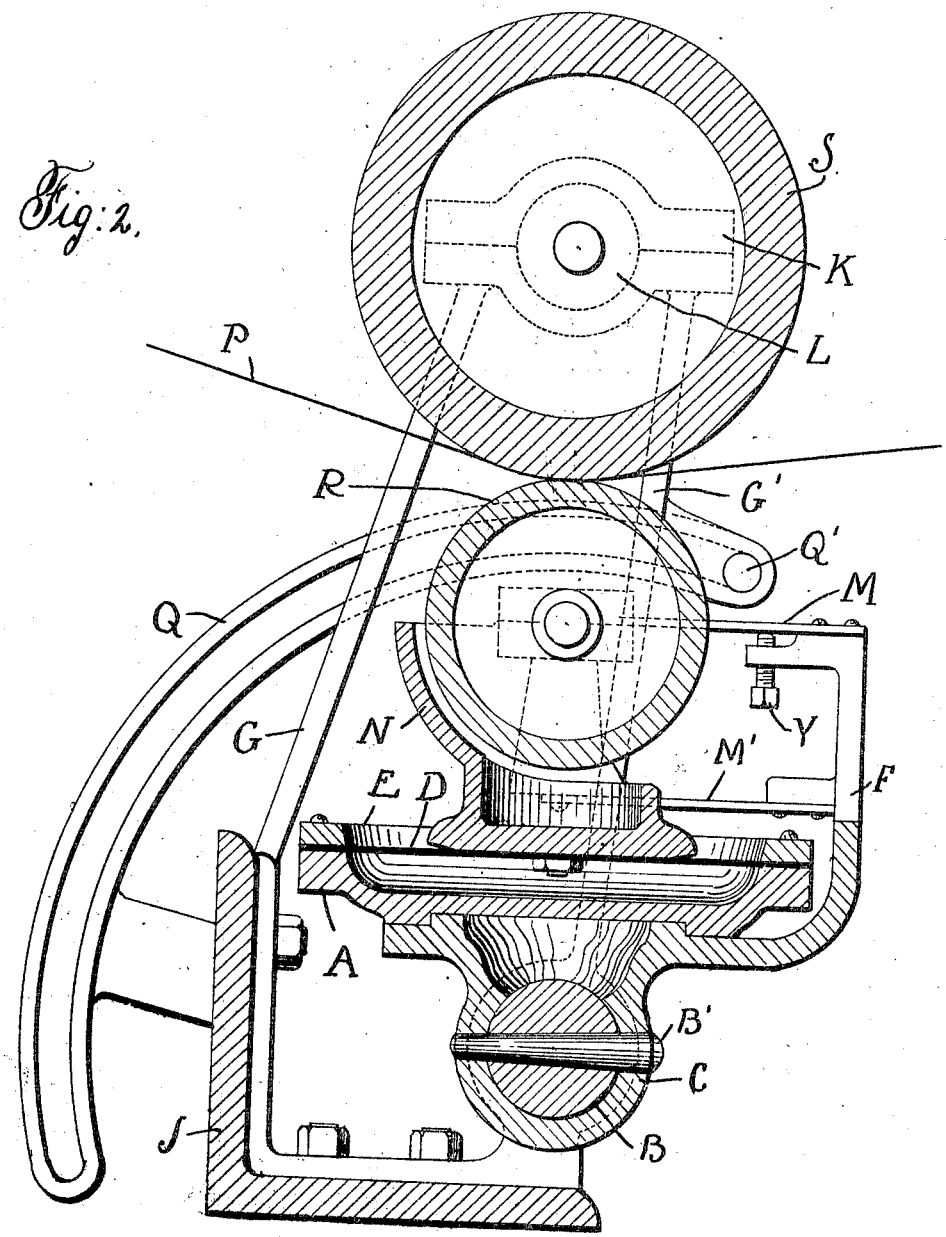
Figure 3:
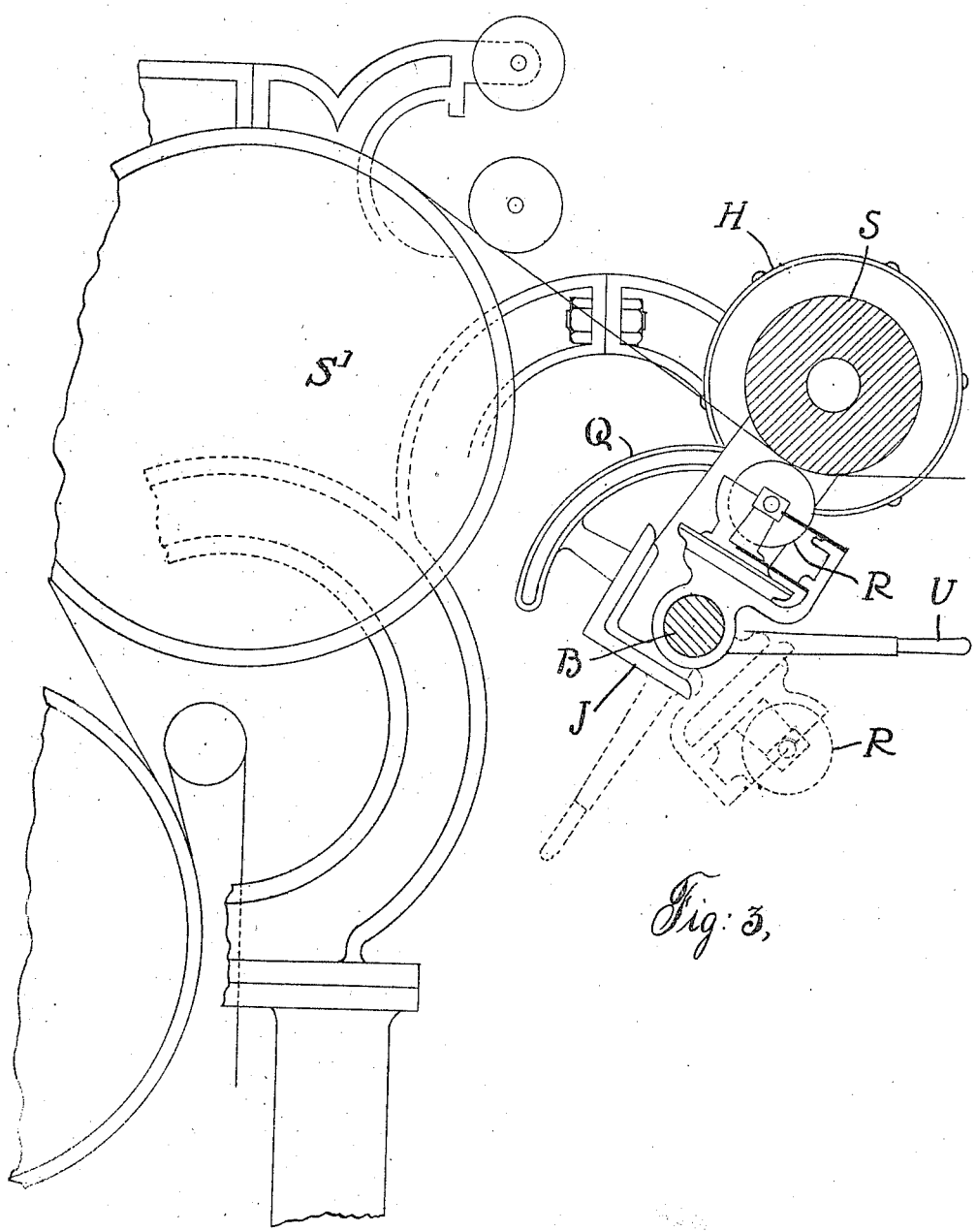

Figure 1 is a side view of the apparatus comprising my invention, partly in cross section. Fig. 2 is a sectional front view of the same, and Fig. 3 is a sectional front view of the device as applied to a paper making machine.

In the drawings I have indicated at S a roll which is supported on two concentric journals K and L, which are secured to the paper making machine in any desired way and preferably near the calender roll $S^1$ over which the paper passes during the process of its manufacture. The journal K carries a frame G comprised of two arms which are rigidly secured to the angle bar J. The lower part of the arm $G^1$ of the frame just referred to constitutes a bearing for the shaft B. This shaft B carries a collar C rigidly secured thereto by the pin $C^1$. The upper part of the frame or collar C supports a diaphragm chamber A, said diaphragm chamber A carrying on its top a diaphragm D held in place by a ring E by any other desired means. The collar C has an upward extending arm F which supports two horizontal springs M and $M^1$. Secured to the surface of the diaphragm D is a frame N, the lower surface of which is slightly convex. This frame N carries the roll R which is supported on the shaft W. This frame N and the roll R are supported against the roller S by the horizontal springs M and $M^1$. I provide a screw nut Y so that the upward pressure of the spring M may be regulated.

The mercury chamber below the diaphragm is connected by a tube V to a glass tube T which may be graduated in any desired way. It is apparent that any downward pressure on the diaphragm will be at once indicated in the tube T, which may be of such a size in proportion to the volume of mercury in the mercury chamber that the movement downward of the roller R will be indicated in a greatly exaggerated way. It is apparent that the thickness of a sheet of paper running between the roller S and the roller R will be indicated at once on the scale T. When there is no paper running between the rollers and they are in contact, it is intended that the mercury in the tube T shall stand at zero.

In order that the roll R may be swung out of position and contact with the roll S when the paper breaks or for any other reason it is necessary to adjust it in relation to the rolls of the paper making machine, I provide a slotted segment Q which is rigidly secured to the end of the shaft B by the pin $B^1$. It is apparent that when the lower roller and its support are revolved with the shaft B, the segment Q which is supported on the arm $G^1$ will allow the shaft to revolve a partial turn and to be brought back again into exactly the same position that it was in relation to the roll S.

Instead of using mercury it is apparent that any other colored fluid such as colored alcohol may be used to the same effect.

My invention therefore comprises a device very simple in construction which may be used in the manufacture of paper whereby the thickness of the paper before it is calendered will be indicated to the operator, and one in which the indicating roll and its support may be swung out of position so that the paper may be easily and quickly repaired or replaced in the rolls of the paper making machine.

While the most practical way of applying my indicator is to use the opposed rollers S and R, still it will be readily understood that there might be other equivalent abutting surfaces which would not interfere with the running of the paper, and the result would be the same.

I claim:—

1. An indicator comprising a rotatable cylinder, a second cylinder, spring means normally holding the second cylinder in peripheral contact with the former, means connected with the latter indicating any motion of the second cylinder radially in relation to the first cylinder, and means connected with one of the cylinders to swing it out of and into peripheral contact with the other.

2. An indicator comprising a rotatable cylinder, a shaft rigidly supported in relation to said cylinder, a frame supported on the shaft and rotatable thereon, a diaphragm carried on the frame, a second rotatable cylinder supported on the diaphragm, spring means carried on the frame to hold the second cylinder in peripheral contact with the first cylinder, and means for rotating the frame and the shaft, thereby moving the second cylinder out of and into peripheral contact with the first cylinder.

3. An indicator comprising a rotatable frame, a diaphragm on the frame, a rotatable cylinder on the diaphragm, a second rotatable cylinder, spring connection between the frame and the first cylinder to hold the cylinder normally in peripheral contact with the second cylinder, and means connected with the diaphragm to indicate any radial movement of the first cylinder in relation to the second cylinder.

4. An indicator comprising two rolls, a movable support for the first roll, spring means normally holding the first roll in peripheral contact with the second roll, a diaphragm engaging the support of the first roll, and means connected with the diaphragm indicating any motion of said roll radially in relation to the other roll.

5. An indicator comprising two rotatable rolls flexibly supported in peripheral contact, means for swinging one of the rolls laterally out of and into peripheral contact with the other, and means connected with one of the rolls indicating any radial movement of the rolls in relation to each other.

NATHANIEL C. LOCKE.

Witnesses:
 FRANK E. LOCKE,
 HARRIET M. FITZ.